United States Patent
Chu et al.

(10) Patent No.: US 10,263,906 B2
(45) Date of Patent: Apr. 16, 2019

(54) FLOW SCHEDULING DEVICE AND METHOD

(75) Inventors: Xunfu Chu, Shenzhen (CN); Youbao Wang, Shenzhen (CN)

(73) Assignees: ZTE Corporation, Shenzhen (CN); Sanechips Technology Co., Ltd., Guangdong (CN)

(*) Notice: Subject to any disclaimer, the term of this patent is extended or adjusted under 35 U.S.C. 154(b) by 1048 days.

(21) Appl. No.: 14/391,735

(22) PCT Filed: Jun. 28, 2012

(86) PCT No.: PCT/CN2012/077738
§ 371 (c)(1),
(2), (4) Date: Nov. 13, 2014

(87) PCT Pub. No.: WO2013/152566
PCT Pub. Date: Oct. 17, 2013

(65) Prior Publication Data
US 2015/0058485 A1   Feb. 26, 2015

(30) Foreign Application Priority Data
Apr. 12, 2012 (CN) .......................... 2012 1 0105943

(51) Int. Cl.
*H04L 12/863* (2013.01)
*H04L 12/869* (2013.01)
(Continued)

(52) U.S. Cl.
CPC ............ *H04L 47/622* (2013.01); *H04L 47/25* (2013.01); *H04L 47/52* (2013.01); *H04L 47/60* (2013.01);
(Continued)

(58) Field of Classification Search
CPC ....... H04L 47/52; H04L 47/60; H04L 47/621; H04L 47/6225; H04L 47/6275; H04L 47/25; H04L 47/622
See application file for complete search history.

(56) References Cited

U.S. PATENT DOCUMENTS

| 8,144,584 B1 * | 3/2012 | Voruganti ............. H04L 47/522 370/232 |
| 2002/0141425 A1 * | 10/2002 | Merani ................... H04L 47/24 370/412 |

(Continued)

FOREIGN PATENT DOCUMENTS

| CN | 1674534 A | 9/2005 |
| CN | 1984067 A | 6/2007 |

(Continued)

OTHER PUBLICATIONS

Weiying Zhu, "High performance queueing and scheduling in support of multicasting in input-queued switches," Old Dominion University, ProQuest Dissertations Publishing, 2006.*

(Continued)

*Primary Examiner* — Oanh Duong
(74) *Attorney, Agent, or Firm* — Banner & Witcoff, Ltd.

(57) ABSTRACT

A method for traffic scheduling includes: authorizing a transmitting module to generate total authorization, allocating the total authorization to each stream queue according to weights preconfigured for each port and a stream queue mounted to each port, and transmitting the allocated authorization to a stream queue management module; the stream queue management module receiving data packets and storing the data packets in each stream queue, maintaining an authorization surplus barrel for each stream queue, storing the received authorization in the authorization surplus barrel of the stream queue, and if the authorization surplus and the queue depth in the authorization surplus barrel are greater (Continued)

than a preset threshold, notifying a scheduling module to output a data packet in the stream queue; and after receiving the notification from the stream queue management module, the scheduling module outputting a data packet in the stream queue according to a preset scheduling policy.

18 Claims, 3 Drawing Sheets

(51) Int. Cl.
    *H04L 12/865* (2013.01)
    *H04L 12/825* (2013.01)
    *H04L 12/873* (2013.01)

(52) U.S. Cl.
    CPC ........ *H04L 47/621* (2013.01); *H04L 47/6225* (2013.01); *H04L 47/6275* (2013.01)

(56) References Cited

U.S. PATENT DOCUMENTS

| | | | | |
|---|---|---|---|---|
| 2004/0213266 A1* | 10/2004 | Willhite | ................ | H04L 47/10 370/395.43 |
| 2005/0060456 A1* | 3/2005 | Shrader | ................ | G06F 9/5016 710/240 |
| 2007/0116025 A1* | 5/2007 | Yadlon | ................ | H04L 47/60 370/412 |
| 2007/0147422 A1* | 6/2007 | Urano | ................ | H04L 47/10 370/468 |
| 2007/0280277 A1* | 12/2007 | Lund | ................ | H04L 49/205 370/412 |
| 2008/0095181 A1* | 4/2008 | Suetsugu | ................ | H04L 45/00 370/412 |
| 2011/0170558 A1* | 7/2011 | Ye | ................ | H04L 49/101 370/417 |
| 2012/0128354 A1* | 5/2012 | Panwar | ................ | H04L 49/101 398/45 |
| 2012/0134371 A1* | 5/2012 | Yang | ................ | H04L 47/623 370/412 |
| 2013/0039178 A1* | 2/2013 | Chen | ................ | H04L 47/22 370/230.1 |
| 2013/0070592 A1* | 3/2013 | Chen | ................ | H04L 47/22 370/230.1 |

FOREIGN PATENT DOCUMENTS

| | | |
|---|---|---|
| CN | 101005453 A | 7/2007 |
| CN | 101009655 A | 8/2007 |
| CN | 101272345 A | 9/2008 |
| CN | 101729386 A | 6/2010 |
| CN | 101834786 A | 9/2010 |
| CN | 102340443 A | 2/2012 |
| WO | 9704563 A1 | 2/1997 |
| WO | WO 2005018154 A1 * 2/2005 ............. H04L 12/42 |
| WO | WO 2012097599 A1 * 7/2012 ............ H01L 47/525 |

OTHER PUBLICATIONS

Zhao Chen, "A performance evaluation of multiplexer scheduling algorithms," Concordia University (Canada), ProQuest Dissertations Publishing, 2004.*
Jian Xu et al., "Traffic scheduling device and method for packet switched network," CN 102340443 A, Description, (Year: 2012).*
International Search Report of PCT/CN2012/077738, dated Jan. 24, 2013.

* cited by examiner

FLOW SCHEDULING DEVICE AND METHOD

TECHNICAL FIELD

The present document relates to the field of communications, and in particular, to an apparatus and method for traffic scheduling.

BACKGROUND OF THE RELATED ART

With the continuous development of communication technology, a full range of service requirements of users need to be met by operators. It can be seen from the integration of telecommunication networks, broadcast television networks and mobile network, there is a general trend to enable the operators to have a capability of all-service operation through the integration of a variety of services. This requires that a communication network must support a variety of services, however, various services have different Quality of Service (QOS) requirements. QOS refers to a series of service requests required to be met by a network when a data stream is transmitted in the network and a mechanism for implementing these service requests. These service requests may be evaluated by a series of indexes, for example, a bandwidth requirement, a transmission delay, a jitter, a packet loss rate, a throughput, etc.

The communication network generally implements the QOS requirements of the network using a traffic management chip. At present, there are two scheduling mechanisms used for traffic management, i.e., a data push scheduling mechanism and a pull scheduling structure, wherein, the data push scheduling mechanism performs corresponding scheduling only after a traffic message arrives at a scheduling node. This scheduling structure is generally divided into two scheduling, i.e., scheduling at an input side and scheduling at an output side. The disadvantages thereof are as follows: there is a physical queue in each level, a lot of queue memories are required, and the requirements on the bandwidth of the control memory and the processing capability of the circuit are high. With the continuous increase of the network capacity and services, the use of such scheduling structure will enable the memories of the traffic management chip to increase exponentially, which limits the number of traffics managed by the chip and is disadvantage to the subsequent expansion.

The feature of the pull scheduling structure is that the actions of the scheduler is driven by authorization, and may not be processed in real time, and there is a low requirements on the bandwidth of the memory controller or the processing capability of the circuit. In a Chinese Patent with a patent application No. 201010236242.2 entitled "TRAFFIC SCHEDULING DEVICE AND METHOD IN A PACKET SWITCHED NETWORK", the pull scheduling is described in detail. The patent specifically discloses that the whole authorization surplus of all queues is maintained in real time, and when the whole authorization surplus is greater than a preset threshold, the authorization representing a fixed number of bytes is transmitted to the queues waiting for authorization, and the queue management module transmits the data packets in the queues in the waiting queues.

The key point of the pull scheduling structure is authorization and management, but the pull scheduling method disclosed in the above patent does not manage the authorization surplus well, and the jitter is poor after the traffic scheduling of queues. The reason is that the whole authorization surplus of all queues is maintained, and the authorization is generated according to a fixed size of granularity, however, the length of the data packet of each queue is different. For example, some queues are long packets in a period of time, after the packets are transmitted, it will cause the whole authorization surplus become negative, as a result, some queues transmit packets, but some other queues can transmit packets only after the whole authorization surplus becomes positive. This results in jitter in the traffic of some queues.

Therefore, there is an urgent need to propose an improved pull scheduling method, which can better control transmission of authorization, and effectively reduce message jitter after traffic scheduling of queues.

SUMMARY OF THE INVENTION

The technical problem to be solved by the present document is to provide an apparatus and method for traffic scheduling, which can better control transmission of authorization, and effectively reduce message jitter after traffic scheduling of queues.

In order to solve the above technical problem, the present document provides an apparatus for traffic scheduling, comprising:

an authorization transmission module, configured to generate total authorization, allocate the total authorization to each stream queue according to weights preconfigured for each port and a stream queue mounted to each port, and transmit the allocated authorization to a stream queue management module, the greater the weight is, the greater the allocated authorization is;

a stream queue management module, configured to receive data packets and store the data packets in each stream queue, maintain an authorization surplus barrel for each stream queue, store the received authorization in the authorization surplus barrel of the stream queue, and if the authorization surplus and the queue depth in the authorization surplus barrel are greater than a preset threshold, notify a scheduling module to output a data packet in the stream queue; and the scheduling module, configured to output a data packet in the stream queue according to a preset scheduling policy after receiving the notification from the stream queue management module.

Preferably, the authorization transmission module is configured to pre-configure weights for each port and a stream queue mounted to each port and allocate the total authorization to each stream queue according to the weights, comprising:

the authorization transmission module includes an authorization generator and a scheduling unit, wherein:

the authorization generator is configured to generate the total authorization; and the scheduling unit is configured to allocate the total authorization to each stream queue level by level from the port to the stream queue according to the weights preconfigured for each port and a stream queue mounted to each port.

Preferably, serial numbers of stream queues in the authorization transmission module correspond one-to-one to serial numbers of stream queues in the stream queue management module; and the stream queue management module is configured to store the received authorization in the authorization surplus barrel of the stream queue, comprising:

the stream queue management module storing the authorization in an authorization surplus barrel of the corresponding stream queue according to the serial numbers of stream queues.

Preferably, the stream queue management module is configured to maintain an authorization surplus barrel for each stream queue, comprising:

when the stream queue is authorized, the stream queue management module adding an authorization granularity of the authorization to an authorization surplus in the authorization surplus barrel; and when the stream queue is scheduled to output a data packet, the stream queue management module subtracting a packet length of the data packet from the authorization surplus; and when there is a data packet joining in the queue, the stream queue management module adding the packet length of the data packet to a queue depth in the authorization surplus barrel; and when the queue is scheduled to output a data packet, the stream queue management module subtracting the packet length of the data packet from the queue depth.

Preferably, the stream queue management module is further configured to notify the scheduling module to output the data packet in the stream queue if the authorization surplus in the authorization surplus barrel is greater than 0 and the queue depth is greater than 0 when a preset threshold of the authorization surplus in the authorization surplus barrel is 0 and a preset threshold of the queue depth is 0.

Preferably, the stream queue management module is further configured to transmit an authorization request to the authorization transmission module, comprising:

for each stream queue, if an authorization difference value in the authorization surplus barrel of the stream queue is less than a preset threshold, transmitting an authorization request for the stream queue to the authorization transmission module; and if the authorization difference value in the authorization surplus barrel of the stream queue is no less than the preset threshold, stopping transmitting the authorization request for the stream queue to the authorization transmission module, the authorization difference value is a difference value between the authorization surplus and the queue depth;

for each stream queue, if the queue depth of the stream queue is 0 and the authorization surplus is negative, continuing transmitting the authorization request for the stream queue to the authorization transmission module until the authorization surplus achieves an initial value; and the authorization transmission module is further configured to allocate the total authorization to each stream queue according to weights preconfigured for each port and a stream queue mounted to each port after receiving the authorization request for each stream queue from the stream queue management module, and only transmit the authorization, which is allocated to the stream queue satisfying transmission of the authorization request to the authorization transmission module, to the stream queue management module according to serial numbers of the stream queues.

Preferably, the stream queue management module is further configured to transmit an authorization request to the authorization transmission module, comprising: for each stream queue, if the authorization surplus in the authorization surplus barrel of the stream queue has achieved a preset maximum value of authorization surplus, stopping transmitting the authorization request for the stream queue to the authorization transmission module.

Preferably, the preset scheduling strategy comprises performing Round-Robin among ports and scheduling stream queues in the ports according to priorities.

Preferably, the apparatus further comprises: a buffer management module, configured to receive and buffer the data packet output by the scheduling module, and output the data packet; maintain a port bandwidth difference value for each port, the serial numbers of ports in the buffer management module corresponding one-to-one to the serial numbers of ports in the authorization transmission module and the stream queue management module; if the port bandwidth difference value of the port in the buffer management module is greater than or equal to the preset threshold, notify the authorization transmission module to stop transmitting authorization to a stream queue mounted to a corresponding port in the stream queue management module, and if the port bandwidth difference value of the port in the buffer management module is less than the preset threshold, notify the authorization transmission module to recover or continue transmitting authorization to a stream queue mounted to a corresponding port in the stream queue management module; wherein, the port bandwidth difference value is a difference value between a traffic of data packets received by the port in the buffer management module from the scheduling module and a traffic of data packets output from the port; and the authorization transmission module is further configured to stop transmitting authorization to the stream queue mounted to a corresponding port in the stream queue management module according to the serial numbers of the ports, or recover or continue transmitting authorization to the stream queue mounted to a corresponding port in the stream queue management module according to the serial numbers of the ports, after receiving the notification from the buffer management module.

In order to solve the above technical problem, the present document further provides a method for traffic scheduling, comprising:

an authorization transmission module generating total authorization, allocating the total authorization to each stream queue according to weights preconfigured for each port and a stream queue mounted to each port, and transmitting the allocated authorization to a stream queue management module, the greater the weight is, the greater the allocated authorization is;

a stream queue management module receiving data packets and storing the data packets in each stream queue, maintaining an authorization surplus barrel for each stream queue, storing the received authorization in the authorization surplus barrel of the stream queue, and if the authorization surplus and the queue depth in the authorization surplus barrel are greater than a preset threshold, notifying a scheduling module to output a data packet in the stream queue; and the scheduling module outputting a data packet in the stream queue according to a preset scheduling policy after receiving the notification from the stream queue management module.

Preferably, the authorization transmission module generating total authorization and allocating the total authorization to each stream queue according to weights preconfigured for each port and a stream queue mounted to each port comprises:

an authorization generator generating the total authorization; and a scheduling unit allocating the total authorization to each stream queue level by level from the port to the stream queue according to the weights preconfigured for each port and a stream queue mounted to each port.

Preferably, serial numbers of stream queues in the authorization transmission module correspond one-to-one to serial numbers of stream queues in the stream queue management module; and the stream queue management module storing the received authorization in the authorization surplus barrel for the stream queue comprises:

the stream queue management module storing the authorization in an authorization surplus barrel of the corresponding stream queue according to the serial numbers of stream queues.

Preferably, the stream queue management module maintaining an authorization surplus barrel for each stream queue comprises:

when the stream queue is authorized, the stream queue management module adding an authorization granularity of the authorization to an authorization surplus in the authorization surplus barrel; and when the stream queue is scheduled to output a data packet, the stream queue management module subtracting the a packet length of the data packet from authorization surplus; and when there is a data packet joining in the queue, the stream queue management module adding the packet length of the data packet to a queue depth in the authorization surplus barrel; and when the queue is scheduled to output a data packet, the stream queue management module subtracting the packet length of the data packet from the queue depth.

Preferably, the scheduling module is notified to output the data packet in the stream queue if the authorization surplus in the authorization surplus barrel is greater than 0 and the queue depth is greater than 0 when a preset threshold of the authorization surplus in the authorization surplus barrel is 0 and a preset threshold of the queue depth is 0.

Preferably, the method further comprises:

the stream queue management module transmitting an authorization request to the authorization transmission module, comprising:

for each stream queue, if an authorization difference value in the authorization surplus barrel of the stream queue is less than a preset threshold, transmitting an authorization request for the stream queue to the authorization transmission module; and if the authorization difference value in the authorization surplus barrel of the stream queue is no less than the preset threshold, stopping transmitting the authorization request for the stream queue to the authorization transmission module, the authorization difference value is a difference value between the authorization surplus and the queue depth;

for each stream queue, if the queue depth of the stream queue is 0 and the authorization surplus is negative, continuing transmitting the authorization request for the stream queue to the authorization transmission module until the authorization surplus achieves an initial value; and the authorization transmission module allocating the total authorization to each stream queue according to weights preconfigured for each port and a stream queue mounted to each port after receiving the authorization request for each stream queue from the stream queue management module, and only transmitting the authorization, which is allocated to the stream queue satisfying transmission of the authorization request to the authorization transmission module, to the stream queue management module according to serial numbers of the stream queues.

Preferably, the stream queue management module transmitting an authorization request to the authorization transmission module further comprises:

for each stream queue, if the authorization surplus in the authorization surplus barrel of the stream queue has achieved a preset maximum value of authorization surplus, stopping transmitting the authorization request for the stream queue to the authorization transmission module.

Preferably, the preset scheduling strategy comprises performing Round-Robin among ports and scheduling stream queues in the ports according to priorities.

Preferably, the method further comprises:

a buffer management module receiving and buffering the data packet output by the scheduling module, and outputting the data packet; maintaining a port bandwidth difference value for each port, the serial numbers of ports in the buffer management module corresponding one-to-one to the serial numbers of ports in the authorization transmission module and the stream queue management module; if the port bandwidth difference value of the port in the buffer management module is greater than or equal to the preset threshold, notifying the authorization transmission module to stop transmitting authorization to a stream queue mounted to a corresponding port in the stream queue management module, and if the port bandwidth difference value of the port in the buffer management module is less than the preset threshold, notifying the authorization transmission module to recover or continue transmitting authorization to a stream queue mounted to a corresponding port in the stream queue management module; wherein, the port bandwidth difference value is a difference value between a traffic of data packets received by the port in the buffer management module from the scheduling module and a traffic of data packets output from the port; and the authorization transmission module stopping transmitting authorization to the stream queue mounted to a corresponding port in the stream queue management module according to the serial numbers of the ports, or recovering or continuing transmitting authorization to the stream queue mounted to a corresponding port in the stream queue management module according to the serial numbers of the ports, after receiving the notification from the buffer management module.

With the apparatus and method for traffic scheduling according to the embodiments of the present invention, the authorization is allocated according to the weights, which can control transmission of authorization well, and can avoid the problem that the jitter is poor after traffic scheduling of queues. With the maintenance of the authorization surplus barrel of a single queue, the scheduling requirements of various queues can be satisfied more accurately, and the authorization of each stream queue can be controlled accurately, thereby enabling the data packet of the message to be scheduled smoothly according to the weights to be output.

PREFERRED EMBODIMENTS OF THE PRESENT INVENTION

The embodiments of the present invention will be described in detail in conjunction with accompanying drawings hereinafter. It should be illustrated that without conflict, the embodiments in the application and the features of the embodiments can be randomly combined with each other.

Embodiments

Figure 1:
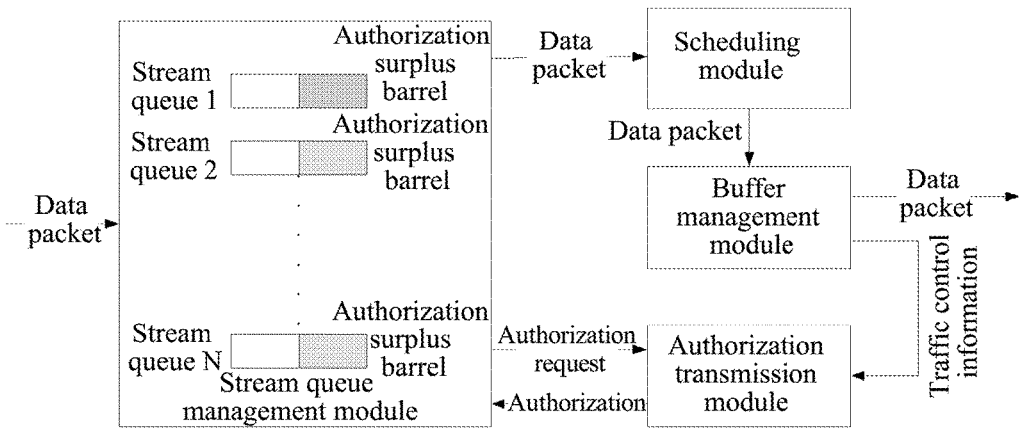
FIG. 1 is a structural diagram of an apparatus for traffic scheduling according to an embodiment.
Figure 2:
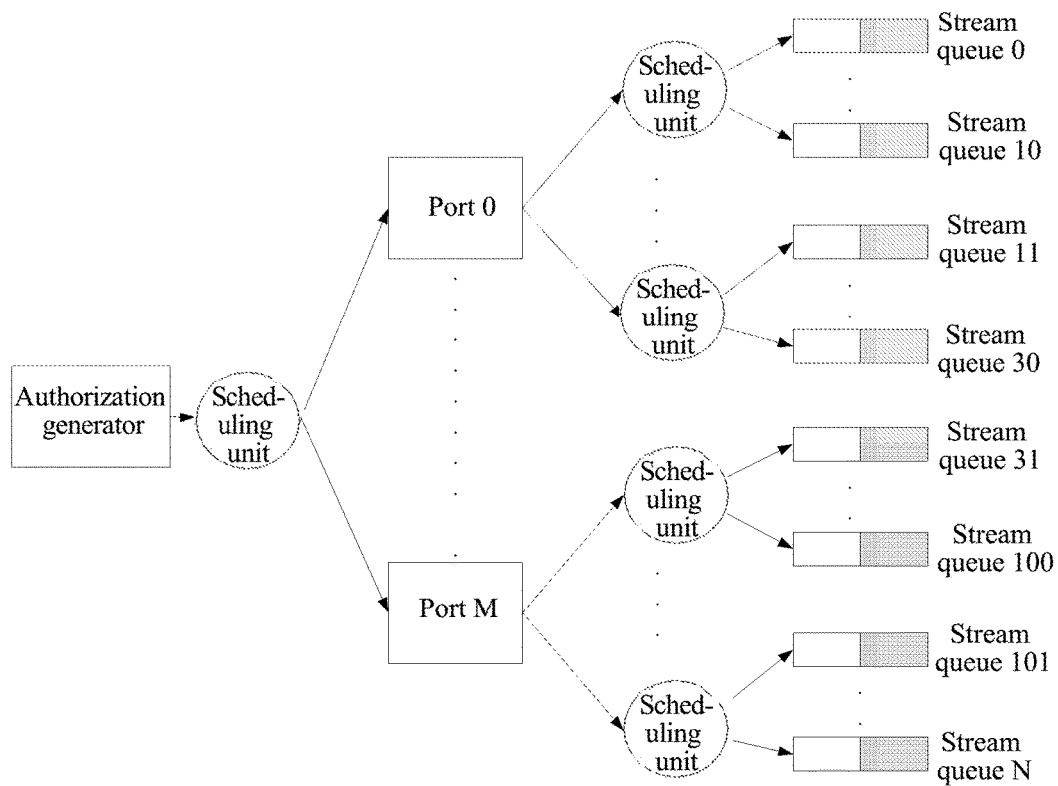
FIG. 2 is a diagram of a mode of an authorization transmission module allocating authorization to a port and a stream queue mounted to the port and a structure of the authorization transmission module.

As shown in FIG. 1, the present embodiment provides an apparatus for traffic scheduling, comprising: a stream queue management module, an authorization transmission module and a scheduling module, and further comprises a buffer management module, wherein:

the authorization transmission module is used to generate total authorization, allocate the total authorization to each stream queue according to weights preconfigured for each port and a stream queue mounted to each port, and transmit the allocated authorization to the stream queue management module, the greater the weight is, the greater the authorization granularity of the authorization is;

wherein, as shown in FIG. 2, the authorization transmission module comprises an authorization generator and a scheduling unit, wherein:

the authorization generator is used to generate the total authorization; and the scheduling unit is used to allocate the total authorization to each stream queue level by level from the port to the stream queue according to the weights preconfigured for each port and a stream queue mounted to each port. Wherein, the weight of the port and the weight of the stream queue may be the same or different, and may be dynamically adjusted or configured by a user.

The authorization transmission module has M ports in total in FIG. 2, and each port is mounted with multiple stream queues, and there are different number of stream queues mounted to various ports. The M ports are mounted with N stream queues in total, and the serial numbers of the stream queues are 1 to N. The total authorization is firstly configured by the scheduling unit to each port, and is then configured by the scheduling unit of the port to a stream queue mounted to the port. In this way, the total authorization is allocated to each stream queue level by level according to the weights of the port and the stream queue.

It should be illustrated that although the structure of the ports and stream queues in the stream queue management module is the same as that in FIG. 2, i.e., a number of stream queues are mounted to a number of ports, the difference is that the stream queue management module includes physical stream queues and physical ports, while ports and stream queues in the authorization transmission module are virtual. However, the serial numbers of the ports and the serial numbers of the stream queues in the authorization transmission module correspond one-to-one to the serial numbers of the ports and serial numbers of the stream queues in the stream queue management module. In this way, when the authorization transmission module transmits the allocated authorization to the stream queue management module, the stream queue management module may directly enable the authorization to correspond to the corresponding stream queues according to the one-to-one corresponding serial numbers of the stream queues, and stores it in the authorization surplus barrel of the corresponding stream queue.

Wherein, the port numbers, the number of stream queues mounted to the ports, the stream queue numbers and the priorities of the stream queues may be configured by a user. Wherein, the scheduling unit may further allocate the priorities of the stream queues to the mounted stream queues, and a number of the scheduling units is decided by the hardware resources of the chip.

the stream queue management module is used to receive data packets and store the data packets in each stream queue, maintain an authorization surplus barrel for each stream queue, store the received authorization in the authorization surplus barrel of the stream queue, and if the authorization surplus and the queue depth in the authorization surplus barrel are greater than a preset threshold, notify the scheduling module to output a data packet in the stream queue;

Wherein, as shown in FIG. 1, the stream queue management module manages N physical stream queues, serial numbers of the N stream queues correspond one-to-one to serial numbers of the stream queues of the authorization transmission module, i.e., from 1 to N, and the stream queue management module stores the authorization in an authorization surplus barrel of a stream queue according to the serial number of stream queue. Each stream queue has a respective authorization surplus barrel to maintain the authorization surplus and queue depth of each stream queue, comprising:

when the stream queue is authorized, the stream queue management module adding an authorization granularity of the authorization to an authorization surplus; and when the stream queue is scheduled to output a data packet, the stream queue management module subtracting the a packet length of the data packet from authorization surplus; and when there is a data packet joining in the queue, the stream queue management module adding the packet length of the data packet to the queue depth; and when the queue is scheduled to output a data packet, the stream queue management module subtracting the packet length of the data packet from the queue depth.

Wherein, the scheduling module is notified to output the data packet in the stream queue if the authorization surplus in the authorization surplus barrel is greater than 0 and the queue depth is greater than 0 when a preset threshold of the authorization surplus in the authorization surplus barrel is 0 and a preset threshold of the queue depth is 0.

In addition, as a preferable implementation, the stream queue management module is further used to transmit an authorization request to the authorization transmission module, which is implemented by an authorization difference value in the authorization surplus barrel, i.e., the authorization difference value=authorization surplus−queue depth, and specifically comprises:

for each stream queue, if an authorization difference value in the authorization surplus barrel of the stream queue is less than a preset threshold, transmitting an authorization request for the stream queue to the authorization transmission module, otherwise, stopping transmitting the authorization request for the stream queue to the authorization transmission module;

preferably, if the authorization surplus in the authorization surplus barrel of the stream queue has achieved a preset maximum value of authorization surplus (absolute authorization threshold), stopping transmitting the authorization request for the stream queue to the authorization transmission module.

in addition, for each stream queue, if the queue depth of the stream queue is 0 and the authorization surplus is negative, continuing transmitting the authorization request for the stream queue to the authorization transmission module until the authorization surplus achieves an initial value; the initial value may be configured by a register, the value may be configured by a user;

the authorization transmission module is further used to allocate the total authorization to each stream queue according to weights preconfigured for each port and a stream queue mounted to each port after receiving the authorization request for each stream queue from the stream queue management module, and only transmit the authorization, which is allocated to the stream queue satisfying transmission of the authorization request to the authorization transmission module, to the stream queue management module according to serial numbers of the stream queues. That is, the authorization allocated by the authorization transmission module to each stream queue is unchanged, and merely the stream queues which stop transmitting an authorization request in the stream queue management module will not receive the authorization.

Wherein, the scheduling module is configured to output a data packet in the stream queue according to a preset scheduling strategy after receiving the notification from the stream queue management module.

Figure 3:
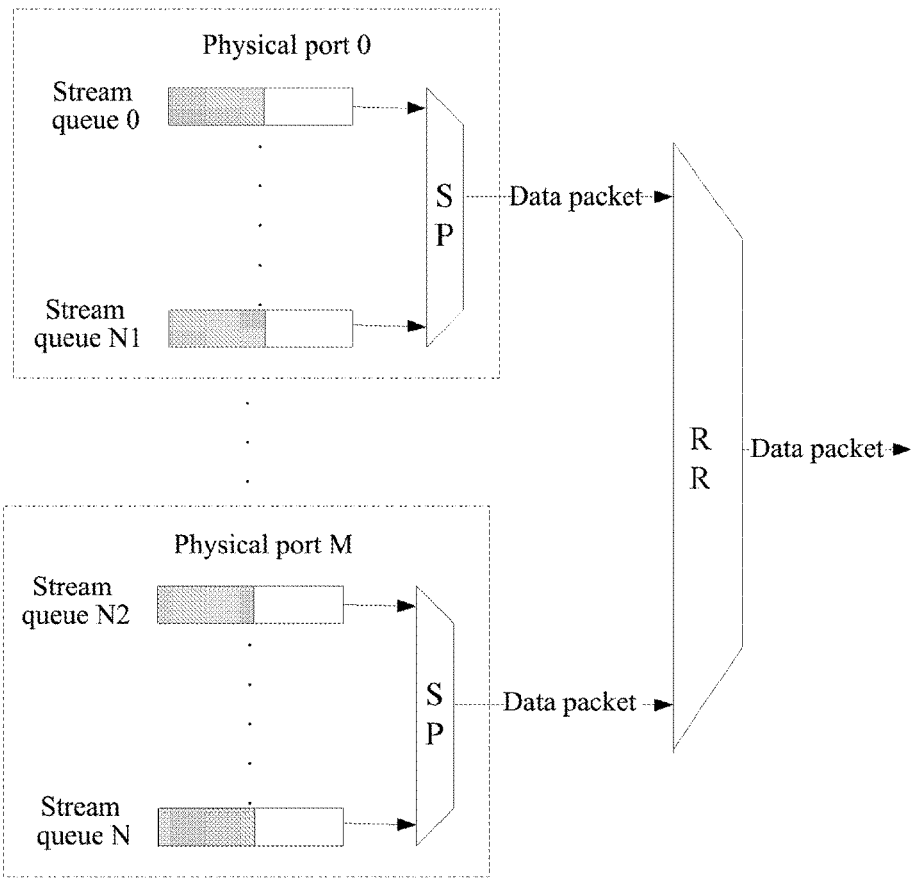
FIG. 3 is a diagram of a scheduling module outputting data packets in stream queues in a mode of SP+RR according to an embodiment.

As described above, the authorization surplus in the authorization surplus barrel in the stream queue needs to be greater than 0 and the depth of the stream queue needs to be greater than 0, that is, the stream queue has satisfies a packet outputting condition. There may be multiple stream queues satisfying such packet outputting condition. Therefore, a certain scheduling strategy is to be used to select one stream queue therefrom to schedule the data packet to output. In the present embodiment, as a preferable implementation, the preset scheduling strategy includes performing Round-Robin (RR for short) among ports and scheduling stream queues in the ports according to priorities (Strict Priority, SP for short), i.e., the scheduling module outputting a data packet in the stream queue in a mode of SP+RR. As shown in FIG. 3, the scheduling strategy of RR is used among M ports, thus ensuring that the M ports can output data packets with an equal opportunity. Each port is mounted with a number of stream queues, and there are N stream queues in total. These stream queues output data packets according to priorities from high to low, and the stream queue with a low priority can be scheduled to output a data packet only in a case that the stream queues with higher priorities do not meet the output scheduling condition. In this way, the particularity of the scheduling of output of the stream queue is considered. The scheduling strategy not only takes fairness into account, but also takes the particularity into account, thereby preventing the data packets with low priorities from being leaked.

In addition, the apparatus further comprises a buffer management module, used to receive and buffer the data packet output by the scheduling module, and output the data packet; maintain a port bandwidth difference value for each port, the port being mounted with one or more stream queues, the serial numbers of ports in the buffer management module also corresponding one-to-one to the serial numbers of ports in the authorization transmission module and the stream queue management module; if the port bandwidth difference value of the port in the buffer management module is greater than or equal to the preset threshold, notify the authorization transmission module to stop transmitting authorization to a stream queue mounted to a corresponding port in the stream queue management module, otherwise, notify the authorization transmission module to recover or continue transmitting authorization to a stream queue mounted to a corresponding port in the stream queue management module; wherein, the port bandwidth difference value is a difference value between a traffic of data packets received by the port in the buffer management module from the scheduling module and a traffic of data packets output from the port;

the authorization transmission module is further used to stop transmitting authorization to the stream queue mounted to a corresponding port in the stream queue management module according to the serial numbers of the ports, or recover or continue transmitting authorization to the stream queue mounted to a corresponding port in the stream queue management module according to the serial numbers of the ports, after receiving the notification from the buffer management module.

Here, the ports in the buffer management module receive data packets transmitted by the scheduling module (serial numbers of the ports in the stream queue management module correspond one-to-one to the serial numbers of ports in the buffer management module). At this time, there is an input traffic of the port. At the same time, the buffer management module transmits the data packet of the port. There is an output traffic of the port, and the output traffic of the port may be less than the input traffic the port. For the buffer management module, it receives the data packet transmitted by the scheduling module. I.e., the input traffic is influenced by two factors, including a total authorization surplus of a corresponding port in the stream queue management module and whether the stream queue of the port has a message, i.e., if the stream queue authorization surplus is greater than a threshold and the queue depth is greater than 0, the packet may be output. As the authorization transmission module transmits the authorization to the corresponding port in the stream queue management module all the time, the port is scheduled to output the packet all the time, to transmit the packet to the buffer management module. This results in a difference value between the traffic of the data packet received by the corresponding port in the buffer management module and the traffic output by the port being greater than a certain threshold. Then the authorization of the corresponding port in the stream queue management module will be accumulated. It is reflected in the buffer management module that the bandwidth difference value of the corresponding port increases gradually. It is reflected in the stream queue management module that the total authorization surplus of the corresponding port increases gradually. When the bandwidth difference value of the port is greater than a preset threshold, it needs to control and manage the traffic of the corresponding port in the stream queue management module, to balance redundant authorization of the port, i.e., the authorization transmission module is notified to stop transmitting authorization to the corresponding port in the stream queue management module. At this time, although there is redundant authorization surplus for the corresponding port of the stream queue management module, with continuous transmission of message from the port to the buffer management module, the buffer management module outputs the data packet, and the bandwidth difference value of the corresponding port in the buffer management module reduces slowly, and the total authorization surplus of the corresponding port of the stream queue management module also reduces slowly. When the bandwidth difference value of the port is less than the preset threshold, the transmission of the authorization of the port may be recovered, thereby achieving the purpose of a dynamic balance between the transmission of the authorization of the ports and the bandwidth of the physical ports.

Figure 4:
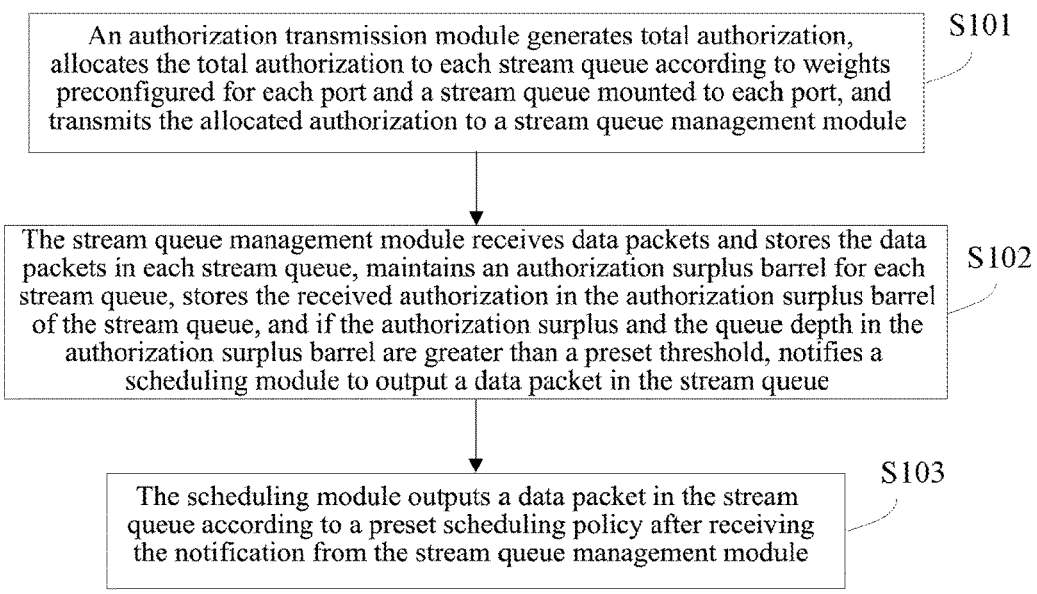
FIG. 4 is a flowchart of a method for traffic scheduling according to an embodiment.

As shown in FIG. 4, the present embodiment provides a method for traffic scheduling, comprising the following steps:

In S101: an authorization transmission module generates total authorization, allocates the total authorization to each stream queue according to weights preconfigured for each port and a stream queue mounted to each port, and transmits the allocated authorization to a stream queue management module, the greater the weight is, the greater the authorization granularity of the authorization is;

Wherein, as shown in FIG. 2, the authorization transmission module comprises an authorization generator and a scheduling unit, the authorization transmission module generating total authorization and allocating the total authorization to each stream queue according to weights preconfigured for each port and a stream queue mounted to each port in step S101 specifically comprises:

the authorization generator generating the total authorization; and the scheduling unit allocating the total authorization to each stream queue level by level from the port to the stream queue according to the weights preconfigured for each port and a stream queue mounted to each port.

Wherein, the weight of the port and the weight of the stream queue may be the same or different, and may be dynamically adjusted or configured by a user. The total authorization is firstly configured by the scheduling unit to each port, and is then configured by the scheduling unit of the port to a stream queue mounted to the port. In this way, the total authorization is allocated to each stream queue level by level according to the weights of the port and the stream queue.

In step S102: the stream queue management module receives data packets and stores the data packets in each stream queue, maintains an authorization surplus barrel for each stream queue, stores the received authorization in the authorization surplus barrel of the stream queue, and if the authorization surplus and the queue depth in the authorization surplus barrel are greater than a preset threshold, notifies a scheduling module to output a data packet in the stream queue;

wherein, the stream queue management module maintaining an authorization surplus barrel for each stream queue comprises:

when the stream queue is authorized, the stream queue management module adding an authorization granularity of the authorization to an authorization surplus in the authorization surplus barrel; and when the stream queue is scheduled to output a data packet, the stream queue management module subtracting the a packet length of the data packet from authorization surplus; and when there is a data packet joining in the queue, the stream queue management module adding the packet length of the data packet to a queue depth in the authorization surplus barrel; and when the queue is scheduled to output a data packet, the stream queue management module subtracting the packet length of the data packet from the queue depth.

Wherein, serial numbers of stream queues in the authorization transmission module correspond one-to-one to serial numbers of stream queues in the stream queue management module.

The stream queue management module storing the received authorization in the authorization surplus barrel for the stream queue comprises:

the stream queue management module storing the authorization in an authorization surplus barrel of a stream queue according to the serial number of the corresponding stream queue.

The scheduling module is notified to output the data packet in the stream queue if the authorization surplus in the authorization surplus barrel is greater than 0 and the queue depth is greater than 0 when a preset threshold of the authorization surplus in the authorization surplus barrel is 0 and a preset threshold of the queue depth is 0.

In the above steps, as a preferable implementation, the stream queue management module further transmitting an authorization request to the authorization transmission module comprises:

for each stream queue, if an authorization difference value in the authorization surplus barrel of the stream queue is less than a preset threshold, transmitting an authorization request for the stream queue to the authorization transmission module, otherwise, stopping transmitting the authorization request for the stream queue to the authorization transmission module, the authorization difference value is a difference value between the authorization surplus and the queue depth;

further, for each stream queue, if the authorization surplus in the authorization surplus barrel of the stream queue has achieved a preset maximum value of authorization surplus, stopping transmitting the authorization request for the stream queue to the authorization transmission module;

for each stream queue, if the queue depth of the stream queue is 0 and the authorization surplus is negative, continuing transmitting the authorization request for the stream queue to the authorization transmission module until the authorization surplus achieves an initial value; the initial value may be configured by a register, or the value may be configured by a user.

The authorization transmission module allocates the total authorization to each stream queue according to weights preconfigured for each port and a stream queue mounted to each port after receiving the authorization request for each stream queue from the stream queue management module, and only transmits the authorization, which is allocated to the stream queue satisfying transmission of the authorization request to the authorization transmission module, to the stream queue management module according to serial numbers of the stream queues.

In step S103: the scheduling module outputs a data packet in the stream queue according to a preset scheduling policy after receiving the notification from the stream queue management module.

Wherein, as a preferable implementation, the preset scheduling strategy comprises performing Round-Robin among ports and scheduling stream queues in the ports according to priorities, i.e., the scheduling module outputting a data packet in the stream queue in a mode of SP+RR. As shown in FIG. 3, the scheduling strategy of Round-Robin (RR) is used among M ports, thus ensuring that the M ports can output data packets with an equal opportunity; the stream queue mounted to each port outputs a data packet according to priorities from high to low, and the stream queue with a low priority can be scheduled to output a data packet only in a case that the stream queues with higher priorities do not meet the output scheduling condition. In this way, the particularity of the scheduling of output of the stream queue is considered.

At this time, in consideration of the problem that there may be authorization accumulation in the port, as a preferable implementation, after the above steps, the present embodiment further comprises the following steps:

a buffer management module receiving and buffering the data packet output by the scheduling module, and outputting the data packet;

maintaining a port bandwidth difference value for each port, the port being mounted with one or more stream queues, and the serial numbers of ports in the buffer management module also corresponding one-to-one to the serial numbers of ports in the authorization transmission module and the stream queue management module;

if the port bandwidth difference value of the port in the buffer management module is greater than or equal to the preset threshold, notifying the authorization transmission module to stop transmitting authorization to a stream queue mounted to a corresponding port in the stream queue management module, otherwise, notifying the authorization transmission module to recover or continue transmitting authorization to a stream queue mounted to a corresponding port in the stream queue management module;

wherein, the port bandwidth difference value is a difference value between a traffic of data packets received by the port in the buffer management module from the scheduling module and a traffic of data packets output from the port; and the authorization transmission module stopping transmitting authorization to the stream queue mounted to a corresponding port in the stream queue management module according to the serial numbers of the ports, or recovering or continuing transmitting authorization to the stream queue mounted to a corresponding port in the stream queue management module according to the serial numbers of the ports, after receiving the notification from the buffer management module.

As the authorization transmission module transmits the authorization to the corresponding port in the stream queue management module all the time, the port is scheduled to output the packet all the time, to transmit the packet to the buffer management module. This results in a difference value between the traffic of the data packet received by the corresponding port in the buffer management module and the output traffic of the port being greater than a certain threshold. Then the authorization of the corresponding port in the stream queue management module will be accumulated. It is reflected in the buffer management module that the bandwidth difference value of the corresponding port increases gradually. It is reflected in the stream queue management module that the total authorization surplus of the corresponding port increases gradually. When the bandwidth difference value of the port is greater than a preset threshold, it needs to control and manage the traffic of the corresponding port in the stream queue management module, to balance redundant authorization of the port. I.e., the authorization transmission module is notified to stop transmitting authorization to the corresponding port in the stream queue management module. At this time, although there is redundant authorization surplus for the corresponding port of the stream queue management module, with continuous transmission of message from the port to the buffer management module, the buffer management module outputs the data packet, and the bandwidth difference value of the corresponding port in the buffer management module reduces slowly, and correspondingly the total authorization surplus of the corresponding port of the stream queue management module also reduces slowly. When the bandwidth difference value of the port is less than the preset threshold, the transmission of the authorization of the port may be recovered, thereby achieving the purpose of a dynamic balance between the transmission of the authorization of the ports and the bandwidth of the physical ports.

Figure 5:
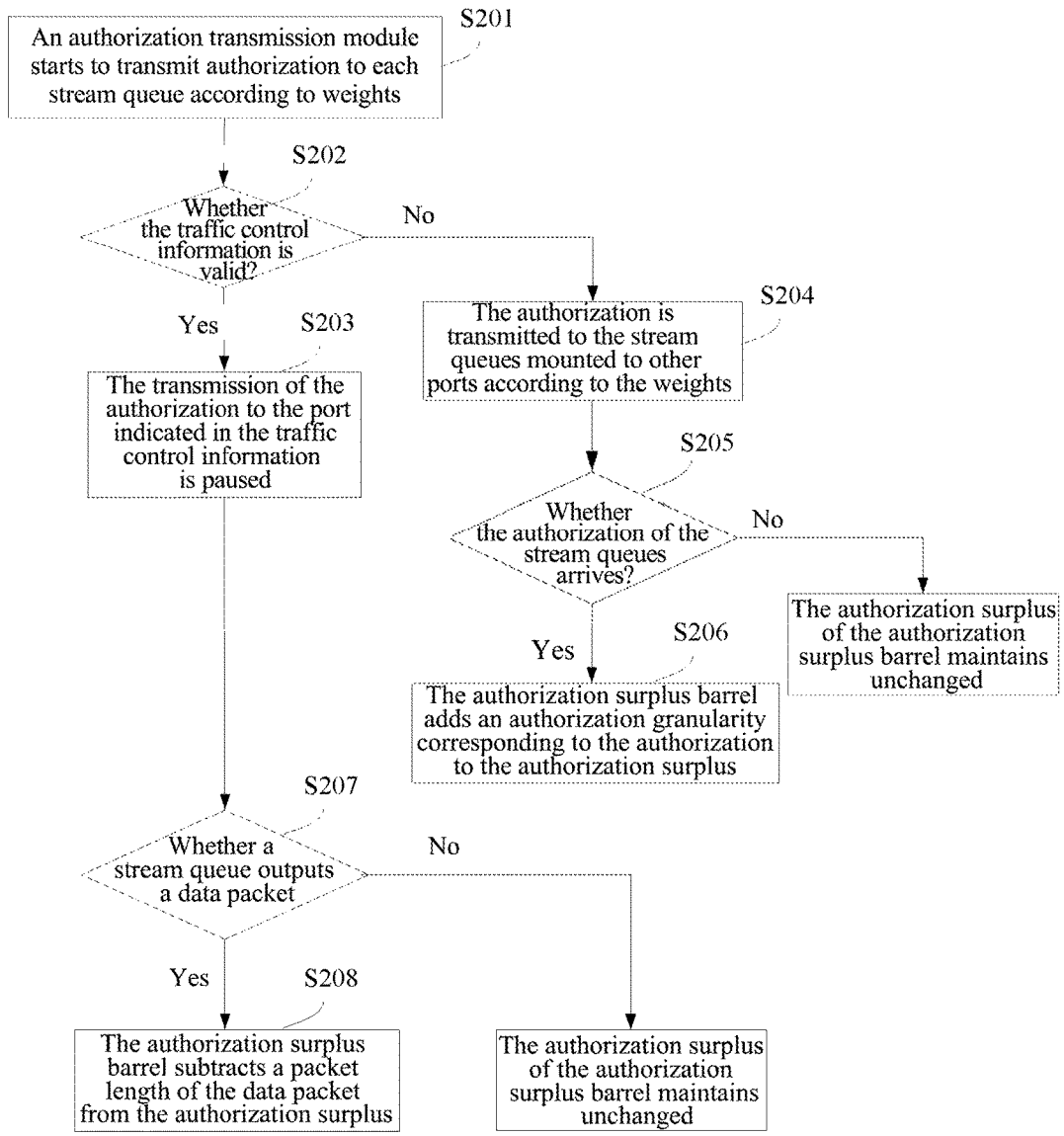
FIG. 5 is a flowchart of a process of maintaining an authorization surplus barrel for each stream queue according to an embodiment.

In an application example, as shown in FIG. 5, a process of maintaining an authorization surplus barrel for each stream queue includes the following steps:

In S201: an authorization transmission module starts to transmit authorization to each stream queue according to weights;

in S202: the authorization transmission module judges whether the traffic control information transmitted by the buffer management module is valid, and if so, it illustrates that it needs to pause transmitting the authorization to the corresponding port and step S203 is performed, otherwise, the process turns to step S204;

in S203: the transmission of the authorization to the port indicated in the traffic control information is paused, and the process turns to step S207;

in S204: the authorization transmission module transmits the authorization to the stream queues mounted to other ports according to the weights;

in S205: the stream queue management module judges whether the authorization arrives at the stream queues, and if so, step S206 is performed; otherwise, the authorization surplus of the authorization surplus barrel maintains unchanged;

in S206: the authorization surplus barrel adds an authorization granularity corresponding to the authorization to the authorization surplus;

in S207: the stream queue management module judges whether an stream queue outputs a data packet; and if so, step S208 is performed; otherwise, the authorization surplus of the authorization surplus barrel maintains unchanged;

in S208, the authorization surplus barrel subtracts a packet length of the data packet from the authorization surplus.

After the above step S204, the orders of the steps S205~S206 and the steps S207~S208 may be changed. I.e., there is a possibility that the authorization is firstly performed, or there is a possibility that the message is firstly output from the queue.

It can be seen from the above embodiment that compared with the prior art, the apparatus and method for traffic scheduling according to the above embodiment allocate authorization according to weights, which control transmission of authorization well, and can avoid the problem that the jitter is poor after traffic scheduling of queues. With the maintenance of the authorization surplus barrel of a single queue, the scheduling requirements of various queues can be satisfied more accurately, and the authorization of each stream queue can be controlled accurately; and the particularity of the scheduling of the output of the stream queue is considered in a mode of priorities and Round-Robin, ensuring that the data packets with high priorities are firstly scheduled to be output, and preventing the packets of the queues with low priorities from being leaked, thus improving the efficiency of the scheduling; and the traffic control mechanism of the buffer management module enables achieving a dynamic balance between the transmission of the authorization of the ports and the bandwidth of the physical ports, thereby efficiently controlling the accumulation of the authorization.

A person having ordinary skill in the art can understand that all or a part of steps in the above method can be implemented by programs instructing related hardware, and the programs can be stored in a computer readable storage medium, such as a read-only memory, disk or disc etc. Alternatively, all or a part of steps in the above embodiments can also be implemented by one or more integrated circuits. Accordingly, each module/unit in the above embodiments can be implemented in a form of hardware, or can also be implemented in a form of software functional module. The present document is not limited to any particular form of a combination of hardware and software.

The above description is only the preferred embodiments of the present invention and is not intended to limit the protection scope of the present document. According to the inventive contents of the present document, the present document can have a plurality of other embodiments. Without departing from the spirit and substance of the present document, those skilled in the art can make various corresponding changes and variations according to the present document, and any modification, equivalent substitution, improvement etc. which are made within the spirit and principle of the present document should belong to the protection scope of the present document.

INDUSTRIAL APPLICABILITY

With the apparatus and method for traffic scheduling according to the embodiments of the present invention, the authorization is allocated according to the weights, which can control transmission of authorization well, and can avoid the problem that the jitter is poor after traffic scheduling of queues. With the maintenance of the authorization surplus barrel of a single queue, the scheduling requirements of various queues can be satisfied more accurately, and the authorization of each stream queue can be controlled accurately, thereby enabling the data packet of the message to be scheduled smoothly according to the weights to be output.

What is claimed is:

1. An apparatus for traffic scheduling, comprising hardware performing instructions stored in a non-transitory medium, the hardware executing the following modules: an authorization transmission module, a scheduling module, a stream queue management module and a buffer management module, wherein:

the authorization transmission module comprises a plurality of ports and a plurality of stream queues, each port mounted with multiple stream queues, wherein the authorization transmission module is configured to generate a total authorization, allocate the total authorization to each stream queue according to weights preconfigured for the each port, and transmit the allocated authorization to the stream queue management module, wherein the greater a weight is, the greater the allocated authorization is;

the stream queue management module is configured to receive data packets and store the data packets in the each stream queue, maintain an authorization surplus barrel for the each stream queue, store the received authorization in the authorization surplus barrel of the each stream queue, and if an authorization surplus and a queue depth in the authorization surplus barrel are greater than a preset threshold, notify the scheduling module to output a data packet in a corresponding stream queue; and the scheduling module is configured to output data packets in the each stream queue according to a preset scheduling policy after receiving a notification from the stream queue management module;

the buffer management module is configured to receive and buffer a data packet output by the scheduling module, and output the data packet; maintain a port bandwidth difference value for the each port, wherein serial numbers of ports in the buffer management module correspond one-to-one to the serial numbers of ports in the authorization transmission module and the stream queue management module; if the port bandwidth difference value of a port in the buffer management module is greater than or equal to the preset threshold, notify the authorization transmission module to stop transmitting authorization to a stream queue mounted to a corresponding port in the stream queue management module, and if the port bandwidth difference value of the port in the buffer management module is less than the preset threshold, notify the authorization transmission module to recover or continue transmitting authorization to a stream queue mounted to a corresponding port in the stream queue management module; wherein, the port bandwidth difference value is a difference value between a traffic of data packets received by the port in the buffer management module from the scheduling module and a traffic of data packets output from the port; and the authorization transmission module is further configured to stop transmitting authorization to a stream queue mounted to a corresponding port in the stream queue management module according to the serial numbers of the ports, or recover or continue transmitting authorization to the stream queue mounted to a corresponding port in the stream queue management module according to the serial numbers of the ports, after receiving the notification from the buffer management module.

2. The apparatus according to claim 1, wherein, the authorization transmission module is configured to pre-configure weights for the each port and the each stream queue mounted to the each port and allocate the total authorization to the each stream queue according to the weights, wherein:

the authorization transmission module includes an authorization generator and a scheduling unit, wherein:

the authorization generator is configured to generate the total authorization; and the scheduling unit is configured to allocate the total authorization to the each stream queue level by level from the each port to the each stream queue according to the weights preconfigured for the each port and the each stream queue mounted to the each port.

3. The apparatus according to claim 1, wherein, serial numbers of stream queues in the authorization transmission module correspond one-to-one to serial numbers of stream queues in the stream queue management module; and the stream queue management module is configured to store the received authorization in the authorization surplus barrel for the each stream queue, wherein:

the stream queue management module stores the authorization in the authorization surplus barrel of the each corresponding stream queue according to serial numbers of the each stream queues.

4. The apparatus according to claim 1, wherein, when one of the stream queues is authorized, the stream queue management module adds an authorization granularity of the authorization to the authorization surplus in the corresponding authorization surplus barrel; and when the one stream queue is scheduled to output a data packet, the stream queue management module subtracts a packet length of the data packet from the authorization surplus; and when there is a data packet joining in the one stream queue, the stream queue management module adds the packet length of the data packet to the queue depth in the corresponding authorization surplus barrel.

5. The apparatus according to claim 4, wherein,
the stream queue management module is further configured to transmit an authorization request to the authorization transmission module, wherein:
for each stream queue, if an authorization difference value in the corresponding authorization surplus barrel of the each stream queue is less than a preset threshold, the stream queue management module is configured to transmit an authorization request for the each stream queue to the authorization transmission module; and if the authorization difference value in the authorization surplus barrel of the each stream queue is no less than the preset threshold, the stream queue management module stops transmitting the authorization request for the each stream queue to the authorization transmission module, the authorization difference value being a difference value between the authorization surplus and the queue depth;
for each stream queue, if the queue depth of the stream queue is 0 and the authorization surplus is negative, the stream queue management module continues transmitting the authorization request for the each stream queue to the authorization transmission module until the authorization surplus achieves an initial value; and
the authorization transmission module is further configured to allocate the total authorization to the each stream queue according to weights preconfigured for the each port and the each stream queue mounted to the each port after receiving the authorization request for the each stream queue from the stream queue management module, and to only transmit the authorization, which is allocated to the each stream queue satisfying transmitting the authorization request to the authorization transmission module, to the stream queue management module according to serial numbers of the stream queues.

6. The apparatus according to claim 4, wherein, the stream queue management module is further configured to transmit an authorization request to the authorization transmission module, wherein: for the each stream queue, if the authorization surplus in a corresponding authorization surplus barrel has achieved a preset maximum value of authorization surplus, the stream queue management module stops transmitting the authorization request for the stream queue to the authorization transmission module.

7. The apparatus according to claim 4, wherein, the scheduling module is configured to output a data packet in a corresponding stream queue according to a preset scheduling policy by:
when a preset threshold of the authorization surplus in an authorization surplus barrel is 0 and a preset threshold of the queue depth is 0, outputting the data packet in the corresponding stream queue if the authorization surplus in the authorization surplus barrel is greater than 0 and the queue depth is greater than 0.

8. The apparatus according to claim 1, wherein,
the stream queue management module is further configured to, when a preset threshold of the authorization surplus in one of the authorization surplus barrels is 0 and a preset threshold of the queue depth is 0, notify the scheduling module to output a data packet in the corresponding stream queue if the authorization surplus in the authorization surplus barrel is greater than 0 and the queue depth is greater than 0.

9. The apparatus according to claim 1, wherein,
the preset scheduling strategy comprises performing Round-Robin among the ports and scheduling stream queues according to priorities.

10. A method for traffic scheduling, performed by an apparatus for traffic scheduling, comprising:
generating a total authorization, allocating the total authorization to each stream queue according to weights preconfigured for each port of a plurality of ports and the each stream queue mounted to each port, wherein the greater a weight is, the greater the allocated authorization is;
receiving data packets and storing the data packets in the each stream queue, maintaining an authorization surplus barrel for the each stream queue, storing the allocated authorization in the authorization surplus barrel of the each stream queue, and if an authorization surplus and a queue depth in an authorization surplus barrel are greater than a preset threshold, outputting a data packet in a corresponding stream queue according to a preset scheduling policy;
receiving and buffering the output data packet, and outputting the data packet; maintaining a port bandwidth difference value for each port; if the port bandwidth difference value of one port is greater than or equal to the preset threshold, stopping transmitting authorization to a stream queue mounted to a corresponding port, and if the port bandwidth difference value of the port is less than the preset threshold, recovering or continuing transmitting authorization to a stream queue mounted to a corresponding port; wherein, the port bandwidth difference value is a difference value between a traffic of data packets received by the port and a traffic of data packets output from the port.

11. The method according to claim 10, wherein,
the step of generating total authorization and allocating the total authorization to the each stream queue according to weights preconfigured for the each port and each stream queue mounted to each port comprises:
generating the total authorization; and
allocating the total authorization to the each stream queue level by level from the each port to the stream queue according to the weights preconfigured for the each port and the each stream queue mounted to each port.

12. The method according to claim 10, wherein,
serial numbers of stream queues allocating with the authorization correspond one-to-one to serial numbers of stream queues that store the data packets; and
the step of storing the received authorization in the authorization surplus barrel for the each stream queue comprises:
storing the authorization in an authorization surplus barrel of a corresponding stream queue according to the serial numbers of stream queues.

13. The method according to claim 10, wherein,
the step of maintaining an authorization surplus barrel for each stream queue comprises:
when each stream queue is authorized, adding an authorization granularity of the authorization to the authorization surplus in the authorization surplus barrel; and
when the stream queue is scheduled to output a data packet, subtracting a packet length of the data packet from the authorization surplus; and when there is a data packet joining in each stream queue, adding the packet length of the data packet to the queue depth in the authorization surplus barrel.

14. The method according to claim 13, further comprising:
transmitting an authorization request, comprising:
for the each stream queue, if an authorization difference value in a corresponding authorization surplus barrel is less than a preset threshold, transmitting an authorization request for the stream queue; and if the authorization difference value in the corresponding authorization surplus barrel is no less than the preset threshold, stopping transmitting the authorization request for the stream queue, the authorization difference value being a difference value between the
for each stream queue, if the queue depth of the stream queue is 0 and the authorization surplus is negative, continuing transmitting the authorization request for the stream queue until the authorization surplus achieves an initial value; and
allocating the total authorization to each stream queue according to weights preconfigured for each port and the stream queue mounted to each port after receiving the authorization request for each stream queue, and only transmitting the authorization, which is allocated to the stream queue satisfying transmitting the authorization request according to serial numbers of the stream queues.

15. The method according to claim 13, wherein, transmitting an authorization request comprising:
for each stream queue, if an authorization surplus in the corresponding authorization surplus barrel has achieved a preset maximum value of authorization surplus, stopping transmitting the authorization request for the stream queue.

16. The method according to claim 13, wherein, the step of outputting a data packet in a corresponding stream queue according to a preset scheduling policy comprises:
when a preset threshold of the authorization surplus in the authorization surplus barrel is 0 and a preset threshold of the queue depth is 0, outputting the data packet in the corresponding stream queue if the authorization surplus in the authorization surplus barrel is greater than 0 and the queue depth is greater than 0.

17. The method according to claim 10, wherein, the step of outputting a data packet in a corresponding stream queue according to a preset scheduling policy comprises:
when a preset threshold of the authorization surplus in an authorization surplus barrel is 0 and a preset threshold of the queue depth is 0, outputting the data packet in the corresponding stream queue if the authorization surplus in the authorization surplus barrel is greater than 0 and the queue depth is greater than 0.

18. The method according to claim 10, wherein,
the preset scheduling strategy comprises performing Round-Robin among ports and scheduling stream queues in the ports according to priorities.

* * * * *